(12) United States Patent
Itsukaichi (10) Patent No.: US 7,356,354 B2
(45) Date of Patent: Apr. 8, 2008

(54) CRADLE, RECEIVING TERMINAL AND RECEIVING METHOD

(75) Inventor: Atsushi Itsukaichi, Kawasaki (JP)

(73) Assignee: Mobile Broadcasting Corporation, Tokyo (JP)

( * ) Notice: Subject to any disclaimer, the term of this patent is extended or adjusted under 35 U.S.C. 154(b) by 453 days.

(21) Appl. No.: 10/808,508

(22) Filed: Mar. 25, 2004

(65) Prior Publication Data

US 2004/0248543 A1 Dec. 9, 2004

(30) Foreign Application Priority Data

Mar. 26, 2003 (JP) ............................. 2003-084982

(51) Int. Cl.
*H04B 1/38* (2006.01)
*H04M 1/00* (2006.01)

(52) U.S. Cl. .................... 455/557; 455/575.9; 455/345

(58) Field of Classification Search ............... 455/3.01, 455/3.02, 575.9, 566, 230–231, 345, 346, 455/348–350, 351, 200, 557; 701/200
See application file for complete search history.

(56) References Cited

U.S. PATENT DOCUMENTS

| | | | | |
|---|---|---|---|---|
| 5,191,312 A | * | 3/1993 | Altmann et al. | 340/441 |
| 5,266,922 A | * | 11/1993 | Smith et al. | 340/525 |
| 6,023,616 A | | 2/2000 | Briskman | |
| 6,031,492 A | * | 2/2000 | Griffin et al. | 343/702 |
| 6,549,774 B1 | * | 4/2003 | Titlebaum et al. | 455/427 |
| 2002/0081987 A1 | * | 6/2002 | Yoshida et al. | 455/277.1 |
| 2004/0204192 A1 | * | 10/2004 | Holloway et al. | 455/575.1 |

FOREIGN PATENT DOCUMENTS

| | | |
|---|---|---|
| JP | 10-308695 | 11/1998 |
| JP | 11-168574 | 6/1999 |
| JP | 2001-004387 | 1/2001 |
| JP | 2002-022468 | 1/2002 |
| JP | 2003-177027 | 6/2003 |

* cited by examiner

*Primary Examiner*—Nguyen T. Vo
(74) *Attorney, Agent, or Firm*—Rader, Fishman & Grauer, PLLC (57) ABSTRACT

When a portable receiving terminal is mounted on a cradle in an automobile, the satellite broadcasted contents is received by use of external antennas connected to the cradle, in place of built-in antennas contained in the portable receiving terminal. Accordingly, by use of the portable receiving terminal of the present invention, the satellite broadcasted contents can be surely received even in an automobile. Furthermore, the received information outputted from the portable receiving terminal can be transmitted to external devices such as car navigation system and the like when being mounted on the automobile. Accordingly, by taking advantages of a car navigation system, a car television and a car stereo mounted on the automobile, the information received by the portable receiving terminal can be displayed in a very lively manner.

14 Claims, 6 Drawing Sheets

CRADLE, RECEIVING TERMINAL AND RECEIVING METHOD

BACKGROUND OF THE INVENTION

1. Field of the Invention

The present invention relates to a technology relating to S-band satellite digital broadcasting that is distributed by making use of a geostationary satellite SAT launched into a geostationary orbit, for instance, over the equator, and more specifically to a cradle, a receiving terminal and a receiving method for receiving broadcasting by bringing a portable receiving terminal in, for instance, an automobile.

2. Description of the Related Art

Japanese Patent Application publication No. 10-308695 is a document that discloses a system for implementing S-band satellite broadcasting. According to the publication, a receiving terminal to be used in S-band satellite digital broadcasting receives an S-band signal that is transmitted from a geostationary satellite and further relayed through reproducing type relays (gap-fillers; hereinafter simply referred to as GFs) disposed on the earth (in particular on the tall building). The receiving terminal has antennas that directly receive an RF signal and a main body that demodulates the RF signal and decodes into a video audio signal. In order that the receiving terminal receives the decoded video audio signal, all these elements are considered to set fixed in a vehicle, however, a palm-top type portable receiving terminal is also available. However, in a case of broadcasting service being permitted to receive by making a service contract with a broadcasting enterprise, it is preferable for the contractant to be able to enjoy the broadcasting service wherever he/she is. Accordingly, a compatible portable receiving terminal that can be used in an automobile is in demand.

In this connection, in a case of the portable receiving terminal being used in a vehicle, in the GF area, an antenna built into the portable terminal can receive S-band broadcasting waves. However, in an area outside of the GF area where directs wave from a satellite is received, the built-in antenna of the portable receiving terminal used in a vehicle becomes incapable of receiving the S-band signals because the electromagnetic waves is being cutoff by a roof of the vehicle (generally made of metal).

Furthermore, demands for video and audio presentations that make use of an audio environment through a car stereo and display of a car navigation system to be used in the vehicle are also strong. However, in a case that the portable receiving terminal is being brought into a vehicle as it is and used, one cannot cope with these demands.

SUMMARY OF THE INVENTION

An object of the present invention is to provide a cradle, a receiving terminal and a receiving method that enable to receive satellite broadcasting surely and irrespective of places using the receiving terminal.

Another object of the present invention is to provide a cradle, a receiving terminal and a receiving method that enables to provide lively information received by a receiving terminal utilizing external devices such as a car navigation system, a car television and a car stereo that are mounted, for instance, on an automobile.

In order to achieve the above objects, a main aspect of the present invention is a cradle used in a car, being mounted on an automobile, comprising a mounting portion to which the receiving terminal is detachably attached and having at least a built-in antenna for receiving a carrier wave convoluted with a signal, for instance, a satellite broadcasting, a reproducing means for reproducing the signal received through the built-in antenna and a first output terminal for outputting the reproduced signal, an external antenna for receiving the carrier wave, an interface portion for transmitting the signal received through the external antenna to the receiving terminal mounted on the mounting portion, a first input terminal capable of being connected to the first output terminal of the receiving terminal mounted on the mounting portion and a second output terminal for outputting the received signal inputted from the first input terminal to an external device.

Here, the external antenna is disposed outside of, for instance, an automobile. Furthermore, the external devices mean existing devices such as a car navigation system, a car television, a home television and a stereo. A cradle involving the invention is disposed at, for instance, a dashboard of an automobile and outputs a received signal from a receiving terminal to a display portion, an amplifier and a speaker of an existing external device.

According to the present invention, since an external antenna is used to receive a carrier wave such as satellite broadcasting in place of a built-in antenna disposed in the receiving terminal, the carrier wave such as satellite broadcasting can be assuredly received even, for instance, inside an automobile. For instance, in a case of an area outside of an area where the S-band signal can be received through, for instance, a reproducing relay (i.e. outside of the GF area), a direct wave from the satellite need to be received. In other words, a radio wave state is very bad. When the receiving terminal is brought in an automobile outside of such GF area and used stand-alone, the built-in antenna cannot excellently receive the radio wave being disturbed by the metal and the like of the automobile. In contrast, in the present invention, since the satellite broadcasting can be received by use of an external antenna disposed outside of, for instance, an automobile, even a direct wave from the satellite can excellently be received. Furthermore, in the present invention, a received signal outputted from the receiving terminal can be transmitted to an external device mounted on an automobile for example, therefore, by making use of the external devices such as a car navigation system, a car television, a car stereo and the like mounted on the automobile, the received images received through the receiving terminal can be presented in a very lively manner. That is, in the case of the receiving terminal being a portable type, often a case is that a display portion is smaller in size and poorer in the definition, alternatively the acoustic performance is poorer compared with the external devices mounted on an automobile. In the present invention, by making use of a display portion and the like of the external devices excellent in these performances, received information can be presented in a very lively manner.

According to the present invention, the receiving terminal may be comprised of means for causing the receiving terminal to shift from a first mode to a second mode when the receiving terminal is mounted on the mounting portion, the first mode being for providing the user with the received signal by using the reproduced signal providing means, the second mode being having the reproduced signal be capable of being output from the second output terminal. Thereby, when a receiving terminal is mounted on a mounting portion, a mode is switched so that a reproduced signal from a receiving terminal may be outputted to an external device. For this reason, the operability is improved.

According to the present invention, the interface portion has a transmitting antenna disposed opposite to the built-in antenna of the receiving terminal mounted on the mounting portion, for transmitting the received signal received through the external antenna. Thereby, with a very simple configuration, that is, without disposing a particular input terminal of a received signal to the receiving terminal, the received signal can be transmitted from the external antenna of the cradle to the receiving terminal.

Furthermore, the present invention has a second input terminal for inputting the control signal transmitted from the external device and transmitting means for transmitting the control signal inputted to the receiving terminal mounted on the mounting portion through the second input terminal. Thereby, the receiving terminal can be controlled using operating means of the external device.

The present invention has a receiving portion receiving the control signal such as infrared from a remote controller for controlling the receiving terminal transmitted from a remote controller and control signal transmitting means for transmitting the received control signal to the receiving terminal mounted on the mounting portion. Thereby, even in the case of a controlling interface between the external device and the receiving terminal is not established, the receiving terminal can be controlled by means of the remote controller.

The present invention comprises a power source inputting portion for being connected with an external direct current power source such as an automobile and a power source supplying portion for supplying the direct current power supply to the receiving terminal mounted on the mounting portion. Thereby, when the receiving terminal is mounted on the mounting portion, charging of electricity is started at the receiving terminal. Accordingly, a device and an operation exclusive for the charge become unnecessary.

Another aspect of the present invention, a receiving terminal has a built-in antenna for receiving the carrier wave convoluted with a signal, a decoding means for decoding the signal received through the built-in antenna, a decoding restricting means for restricting decoding by the decoding means, reproducing means for reproducing the received signal decoded by the decoding means and an outputting means for outputting the received signal decoded by the decoding means.

Since the present invention has means for externally outputting the reproduced signal decoded by the decoding means, even a contract for pay broadcasting is made, for example, for only one receiving terminal, image can be displayed in another external device.

According to the present invention, means for causing the receiving terminal to shift from a first mode to a second mode according to a state of a trigger signal from trigger signal output means, the first mode being for providing the user with the received signal by using the reproduced signal providing means, the second mode being having the reproduced signal be capable of being output from the second output terminal. Thereby, the received signal can be externally output with excellent operability.

The present invention may further be comprised of controlling signal inputting means for inputting the controlling signal from outside the receiving terminal. Thereby, the receiving terminal becomes able to be operated from outside.

The present invention may include a restricting means for restricting reproduction by the reproducing means or the output of the reproduced signal by the outputting means according to a brake signal included in the controlling signal inputted by the controlling signal inputting means. Thereby, by receiving the brake signal from an external device such as a car navigation system, reproduction of an image by the reproducing means or an output of the reproduced signal by the outputting means can be restricted.

Furthermore, according to another aspect of the present invention, a receiving method in a receiving system comprising a receiving terminal and a cradle, the receiving terminal having a built-in antenna for receiving the carrier wave convoluted with a signal, a reproducing means for reproducing the signal received through the built-in antenna, a reproduced received signal providing means for providing the received signal reproduced by the reproducing means to a user and a first outputting terminal for outputting the reproduced received signal, and the cradle having a mounting portion to which the receiving portion is detachably attached, an external antenna for receiving the carrier wave, an interface portion for transmitting the signal received through the external antenna to the receiving terminal mounted on the mounting portion, a first input terminal capable of being connected to the first output terminal of the receiving terminal mounted on the mounting portion and a second output terminal for outputting the received signal inputted from the first input terminal, comprising the steps of, providing the received reproduced signal by the reproducing signal providing means and causing the receiving terminal to shift from a first mode to a second mode when the receiving terminal is mounted on the mounting portion, the first mode being for providing a user with the received signal with the reproduced signal providing means and the second mode being having the reproduced signal be capable of being output from the second output terminal. Here, the steps of receiving the carrier wave directly from the first antenna and receiving the carrier wave indirectly from the interface portion and the first antenna through the external antenna when the receiving terminal is mounted on the mounting portion may be further included.

These objects and other objects and benefits of the present invention can be easily confirmed by referencing the explanations and attached drawings below.

DETAILED DESCRIPTION OF THE PREFERRED EMBODIMENTS

Embodiments according to the present invention will be explained with the drawings.

Figure 1:
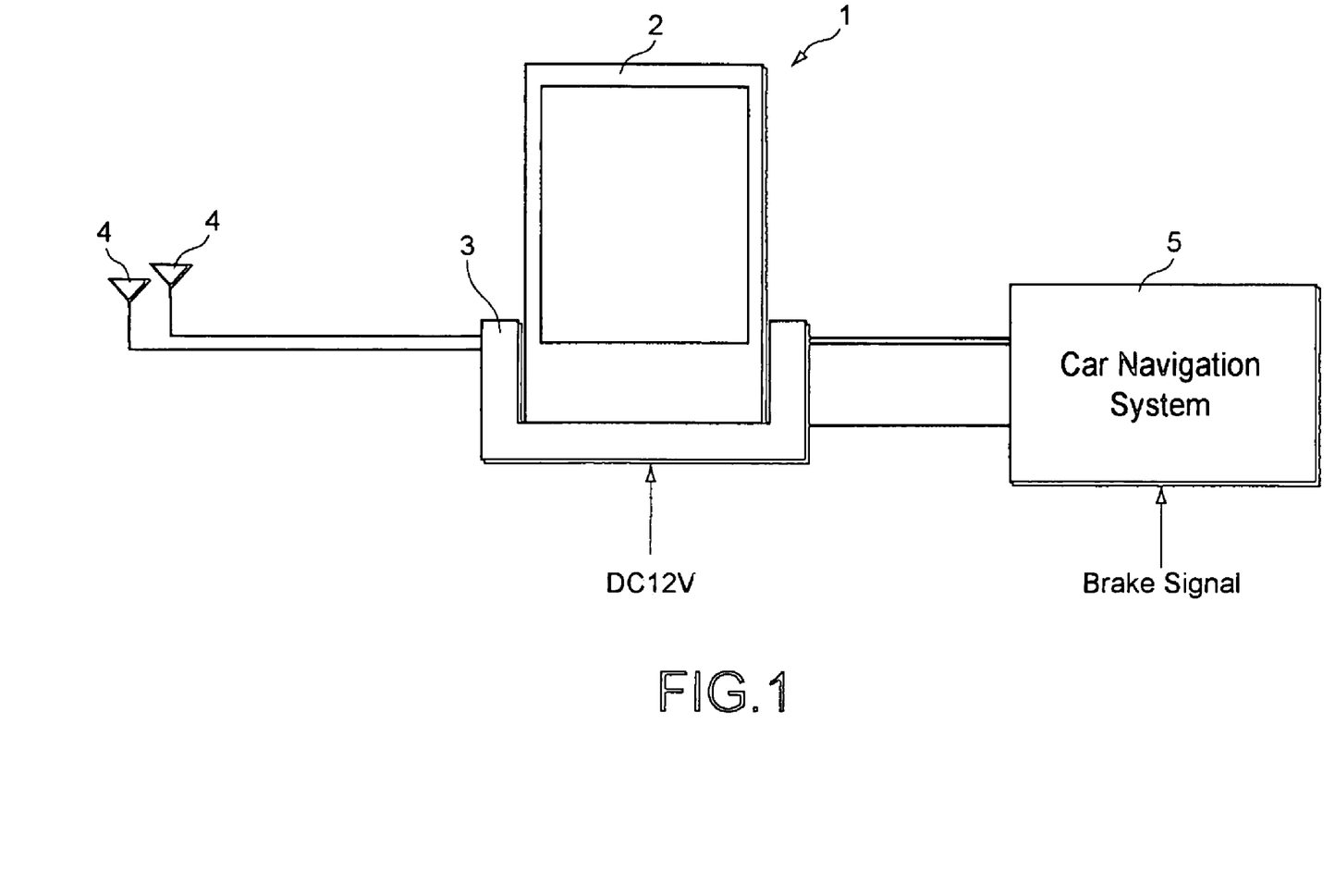
FIG. 1 is a schematic structure diagram of a receiving system involving one embodiment of the present invention.

FIG. 1 is a schematic structure diagram of a receiving system according to an embodiment of the present invention.

As shown in FIG. 1, the receiving system 1 is comprised of a portable receiving terminal 2 that can receive satellite broadcasting and can display images and output sound in a stand-alone state, and a car cradle 3 to be mounted on, for example, a dashboard of an automobile. A pair of external antennas 4 disposed outside of, for instance, an automobile is connected to the car cradle 3 and also to a car navigation system 5 mounted, for instance, on the automobile. A Code Division Multiplexing (CDM) system which is capable of excellently receiving even in a multi-path environment is preferably used in the transmission of broadcasting signal in the satellite broadcasting. Nevertheless, any other systems may be used. In CDM system, anti-multi path characteristics can be realized by implementing RAKE reception in which signals transmitted in a multi-path phasing within one symbol of a stream of transmitted digital data reaches to the receiver scattered are isolated by a plurality of correlation receivers and synthesized to increase a power of the signal as being received by the receiver.

Figure 2:
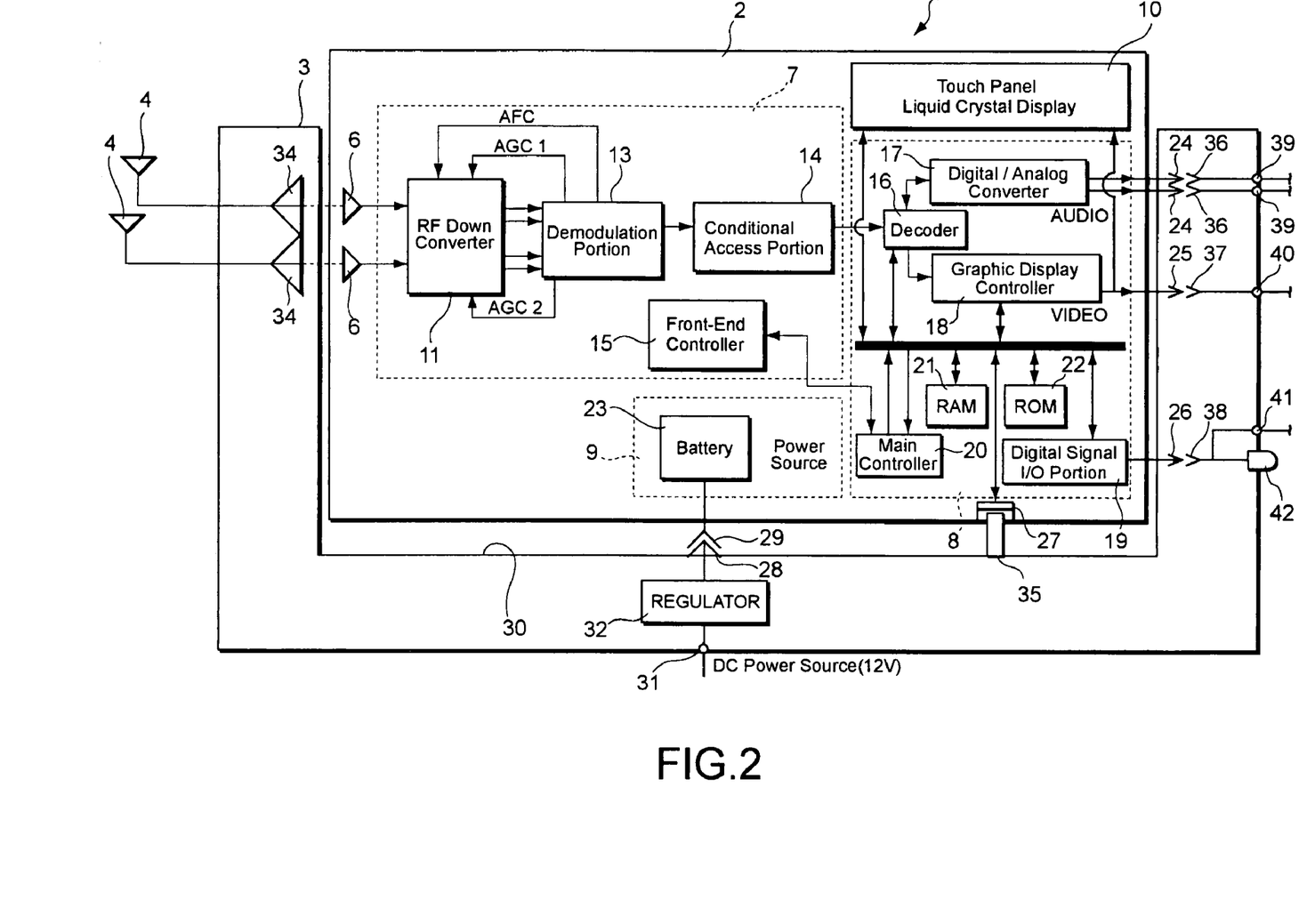
FIG. 2 is a diagram showing a structure of a portable receiving terminal and a car cradle shown in FIG. 1.

FIG. 2 is a diagram showing a structure of a portable receiving terminal 2 and a car cradle 3.

As shown in FIG. 2, a main portion of the portable receiving terminal 2 is comprised of a pair of built-in antennas 6 for performing a diversity reception, a front-end portion 7, a back-end portion 8, a power source portion 9 and a touch panel liquid crystal display 10.

The front-end portion 7 has an RF down-converter 11 that down-converts the RF signal inputted from the built-in antenna 6 and delivers to a demodulation portion 13 that demodulates the RF signal, a conditional access portion 14 regulating the decoding of the RF signal in accordance with the presence of subscription in a conditionally accessible or reception-restricted pay broadcasting, and a front-end controller 15 that controls entire front-end portion 7.

The back-end portion 8 includes a decoder 16 that decodes a signal demodulated by the front-end portion 7; a digital/analog converter 17 that converts a decoded digital signal to an analog audio signal, a graphic display controller 18 that converts the decoded digital signal to, for instance, an NTSC video signal, a digital signal input/output portion 19 where a control signal is inputted from/outputted to the outside, a main controller 20 for collectively controlling an entire system, and others such as RAM 21 and ROM 22.

The power source portion 9 includes a battery 23 for supplying power to the respective portions.

Furthermore, the portable receiving terminal 2 further includes an audio signal output terminal 24 for outputting an audio signal, a video signal output terminal 25 for outputting a NTSC signal as a video signal, a digital signal input/output terminal 26 for inputting/outputting a digital signal also as a control signal, a pushdown switch 27 for switching modes that is described later, and a connector/mechanical lock 29 being locked when coming into contact with a connector/mechanical lock 28 on the car cradle 3 side. Power is supplied from the car cradle 3 side as the connector/mechanical lock 29 contacts with the connector/mechanical lock 28 of the car cradle. The supplied power is consumed to operate the portable receiving terminal 2 and to charge the battery 23 in the power source portion 9.

The car cradle 3 has a mounting portion 30 where the portable receiving terminal 2 is detachably mounted. The mounting portion 30 has, for instance, a concave structure that accommodates and holds a lower portion of the portable receiving terminal 2 in an erected state. A user can see a screen of a touch panel liquid crystal display 10 of the portable receiving terminal 2 in a state where the portable receiving terminal 2 is mounted on the mounting portion 30, and can apply an input operation to the touch panel liquid crystal display 10.

At the bottom portion of the mounting portion 30, the connector/mechanical lock 28 being locked when coming into contact with the connector/mechanical lock 29 of the portable receiving terminal 2 that is mounted on the mounting portion 30. As mentioned above, the connector/mechanical lock 28 works as a connector for charging the portable receiving terminal 2 when the portable receiving terminal 2 is being mounted on the mounting portion 30. The connector/mechanical lock 28 has a power source input terminal 31 for receiving supply of a DC power source of, for instance, 12 V from a battery (not shown in the drawing) of an automobile, and the power source input terminal 31 and the connector/mechanical lock 28 are connected through a regulator 32.

Furthermore, to the car cradle 3, for instance, two external antennas 4 for receiving the satellite broadcasting are connected. By disposing two external antennas 4, the portable receiving terminal 2 mounted on the mounting portion 30 can perform the diversity reception. On a wall portion of the mounting portion 30, a pair of transmission antennas 34 is disposed so as to face each of the built-in antennas 6 of the portable receiving terminal 2 that is mounted on the mounting portion 30, and each of the external antennas 4 is connected to each of the transmission antennas 34. Thereby, a signal received from the external antennas 4 can be transmitted in a non-contact manner to the side of the portable receiving terminal 2. In the case of the non-contact transmission, advantages due to the CDM system can be enjoyed. In the case of the non-contact transmission, similar to a situation where the portable receiving terminal 2 is not mounted on the car cradle 3, the built-in antennas 6 comes to receive the multi-path thus the quality of the received signal deteriorates, however, by receiving the signal of the CDM system in "RAKE" in the demodulation portion 13, the reception high in the anti-multipath characteristics can be realized. In particular, in the receiving terminal mounted on a car where the signal that arrives every minute varies and the reflected waves become a multi-path. Accordingly, in the case of a signal of the CDM system being "RAKE" received in a non-contact manner from the external antennas 4 on a side of the portable receiving terminal 2, the reception high in the anti-multipath characteristics can be realized. However, the received signal from the external antennas 4 may also be transmitted in a contact manner to the side of the portable receiving terminal 2.

On a bottom portion of the mounting portion 30, a projection 35 is disposed as mode switching means at a position corresponding to a pushdown switch 27 for switching modes of the portable receiving terminal 2 mounted on the mounting portion 30. Thereby, when the portable receiving terminal 2 is mounted on the mounting portion 30, the pushdown switch 27 is pushed down by the projection 35 and thereby the mode switching described later is carried out. Moreover, instead of performing mode switching by means of a combination of such projection 35 and the pushdown switch 27, other means such as a contact-free mode switching by use of a light receiving element and a light-emitting element that exchange a particular signal may be used.

Furthermore, on a wall portion of the mounting portion 30 of the car cradle 3, an audio system connection terminal 36 connected to an audio signal output terminal 24 of the portable receiving terminal 2 mounted on the mounting portion 30, a video system connection terminal 37 connected to a video signal output terminal 25, and a control system connection terminal 38 connected to a digital signal input/output terminal 26 are disposed.

Furthermore, the car cradle 3 is provided with an audio signal output terminal 39 connected to the audio system connection terminal 36, a video signal output terminal 40 connected to the video system connection terminal 37, a digital signal input/output terminal 41 connected to the control system connection terminal 38, and an infrared receiver 42 for receiving an infrared control signal from a remote controller (not shown in the drawing) for controlling the portable receiving terminal 2. A signal received by the infrared receiver 42 is transmitted through the control system connection terminal 38 to a side of the portable receiving terminal 2. The audio signal output terminal 39, the video signal output terminal 40 and the digital signal input/output terminal 41, are connected to the car navigation system 5 as an external device as shown in FIG. 3.

Figure 3:
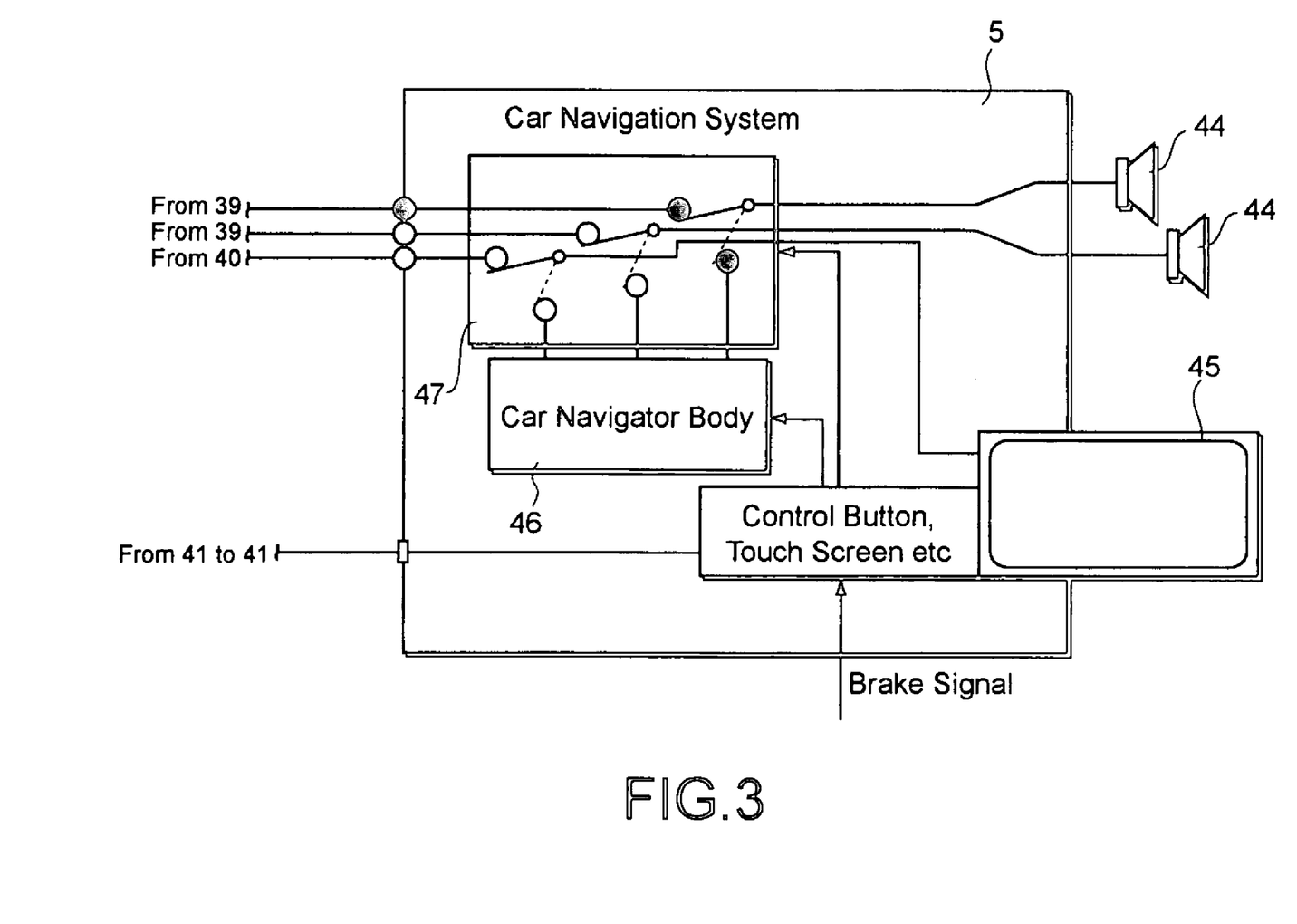
FIG. 3 is a structural diagram showing one example of a car navigation system applied to the invention.

The car navigation system 5, as shown in FIG. 3, has a car speaker 44, a liquid crystal display 45 of, for instance, a touch panel type, a car navigator body 46 and a switching portion 47. The car navigator body 46 collectively controls the entire system as well as outputting a video signal and an audio signal for car navigation, a video signal and an audio signal for a television and an audio signal for radio. The switching portion 47 switches the output of a signal to be transmitted to the liquid crystal display 45 i.e. switching between the signal coming from the car navigator body 46 and the signal coming from the car cradle 3 that are to be transmitted to the liquid crystal display 45. Furthermore, a brake signal from the automobile is inputted to the car navigation system 5 and in accordance with the brake signal, the display in the liquid crystal display 45 is restricted. Specifically, in a braked state, the display to the liquid crystal display 45 is performed, and when the brake is released, the display to the liquid crystal display 45 is restricted. The brake signal is transmitted through the digital signal input/output terminal 41 of the car cradle 3 to a side of the portable receiving terminal 2. However, the brake signal from an automobile may also be transmitted to the portable receiving terminal without passing through the car navigation system 5 but passing through the car cradle 3.

Figure 4:
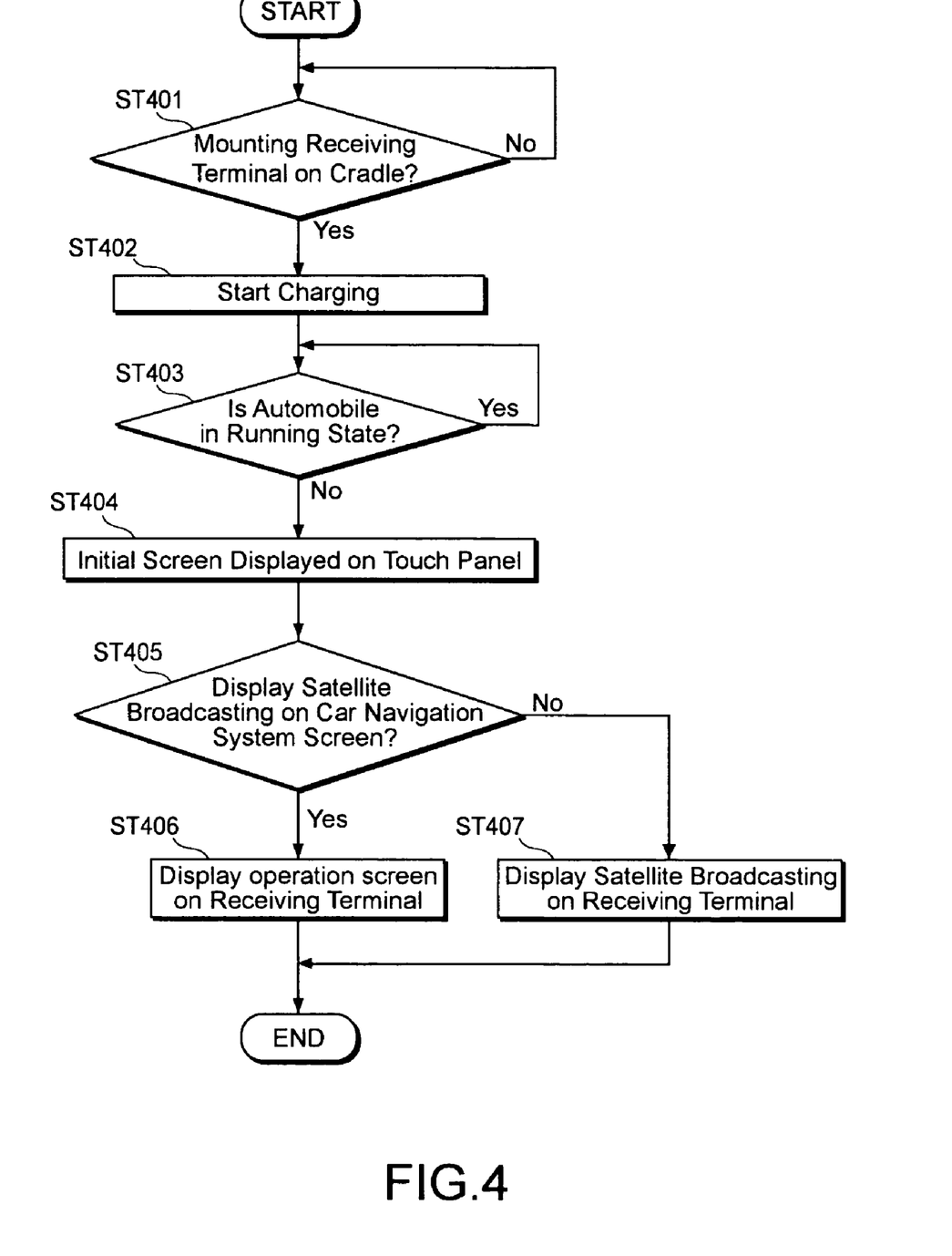
FIG. 4 is a flowchart for explaining an operation of a portable receiving terminal of the present embodiment.

Next, an operation when the satellite broadcasting is received in an automobile will be explained with reference to a flowchart shown in FIG. 4.

A user brings a portable receiving terminal 2 into an automobile and plugs the portable receiving terminal 2 into a car cradle 3. When the portable receiving terminal 2 is thus plugged in the car cradle 3, a projection 35 of the car cradle 3 pushes down a pushdown switch 27 for switching modes of the portable receiving terminal 2, thereby, a main controller 20 recognizes that the portable receiving terminal was plugged in the car cradle 3 (step 401), and electric power is supplied from a Direct Current (DC) power source of, for instance, 12 V equipped on the automobile side through a regulator 32 to the portable receiving terminal 2 and charge to the portable receiving terminal 2 starts (step 402). At this time, the main controller 20 switches the portable receiving terminal 2 from a mode where a touch panel liquid crystal display 10 of the portable receiving terminal 2 displays satellite broadcasted contents to a mode capable of outputting the satellite broadcasting to a car navigation system 5.

Figure 5:
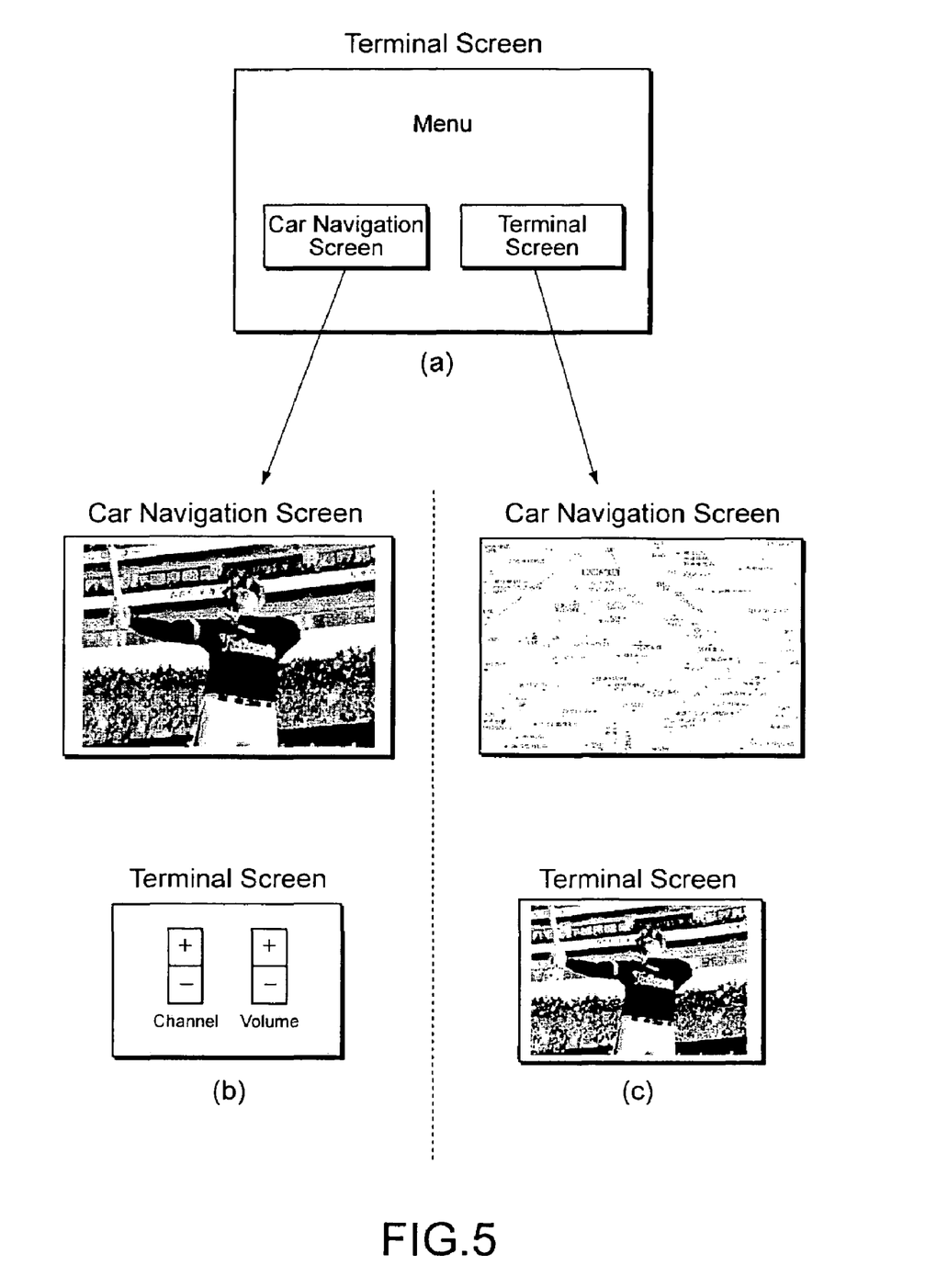
FIG. 5 are diagrams showing examples of display screens in a portable receiving terminal and a car navigation system involving the embodiment.

After the charging being started, the main controller 20 judges whether the automobile is in a running state or not (step 403). Specifically, for instance, a brake signal transmitted from the automobile to the car navigation system 5 is transmitted to the side of the portable receiving terminal 2, and the main controller 20 of the portable receiving terminal 2 judges whether the automobile is in a running state or not based on the brake signal. When the automobile is in motion, the main controller 20 does not display any images such as an initial picture and the like that are described later on the touch panel liquid crystal display 10 of the portable receiving terminal 2 (YES of step 403). On the other hand, when the automobile is in a resting state, the main controller 20 displays an image such as an initial picture and the like as shown in FIG. 5A on the touch panel liquid crystal display 10 of the portable receiving terminal 2 (step 404). Thereby, security of a driver can be obtained.

In an initial picture, the user selects whether the satellite broadcasted contents is to be displayed on a display 45 of the car navigation system 5 or on the touch panel liquid crystal display 10 of the portable receiving terminal 2 (step 405). In the case of the satellite broadcasted contents being displayed on the display 45 of the car navigation system 5, as shown in, for instance, FIG. 5B, an operation screen for selecting programs and the like is displayed on the touch panel liquid crystal display 10 of the portable receiving terminal 2 (step 406). On the other hand, in the case of the satellite broadcasted contents being displayed on the touch panel liquid crystal display 10 of the portable receiving terminal 2, as shown in, for instance, FIG. 5C, a screen of the car navigation is displayed on the display 45 of the car navigation system 5 (step 407).

Thus, in the system according to the present embodiment, since external antennas 4 receive the satellite broadcasted contents in place of the antennas 6 built into the portable receiving terminal 2, the satellite broadcasting can be received steadily even in an automobile with the portable receiving terminal 2. Furthermore, received information outputted from the portable receiving terminal 2 can be transmitted to an external device such as a car navigation system 5 mounted on an automobile, accordingly, by taking advantages of external devices such as the car navigation system 5, a car television and a car stereo mounted on the automobile, the received information due to the portable receiving terminal 2 can be presented in a very lively manner. Accordingly, the car cradle 3 according to the present invention enables the user to make use of a portable receiving terminal for two different purposes; for carrying everyday and for using in the automobile with a single portable receiving terminal 2, in place of purchasing two terminals for each purpose. Furthermore, when the program broadcasting is pay broadcasting where subscription is necessary, the broadcasting can be received by both on one's person and on board an automobile with a single contract by using a portable receiving terminal 2.

Figure 6:
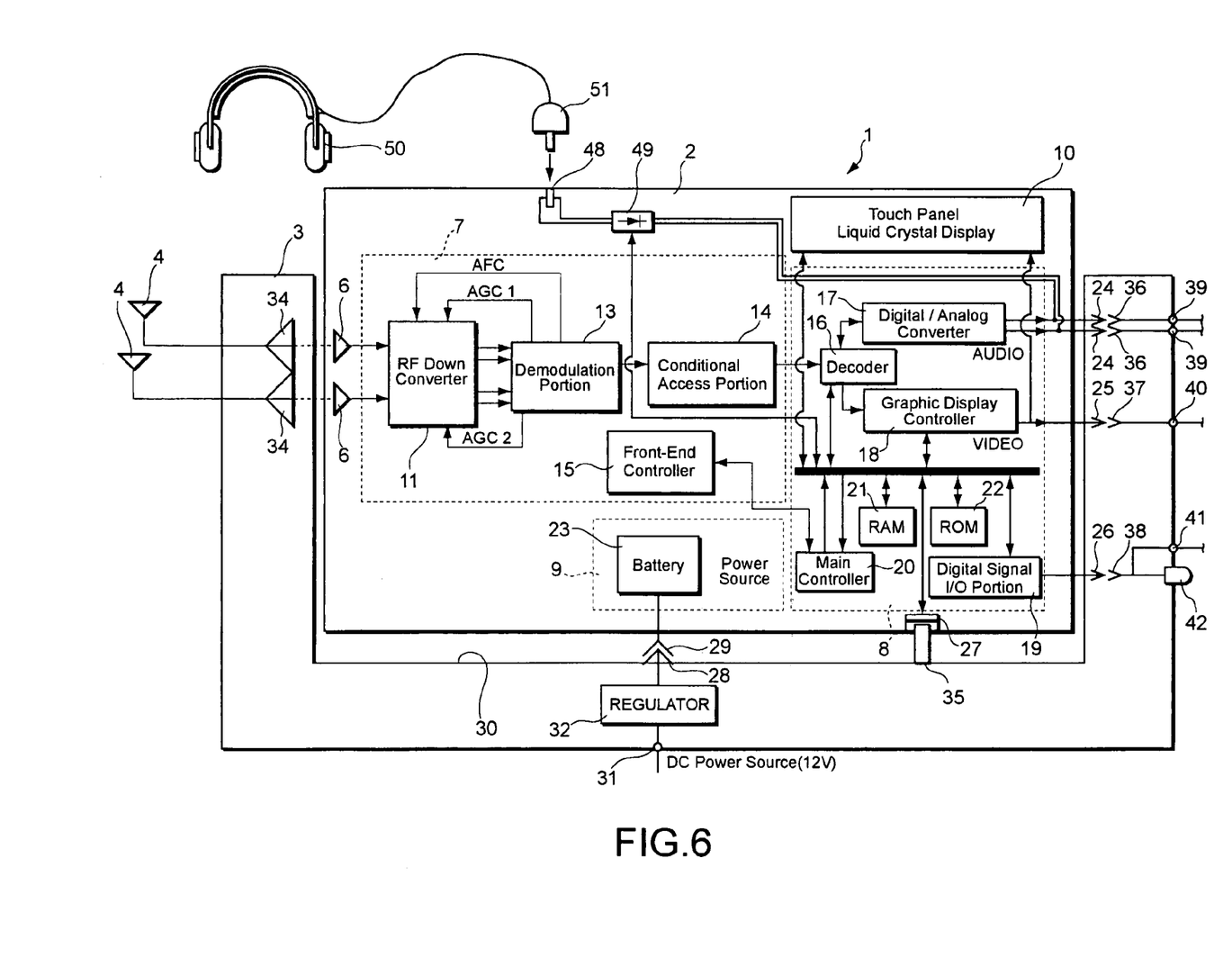
FIG. 6 is a diagram showing a structure of a portable receiving terminal and a car cradle involving another embodiment of the invention.

FIG. 6 shows another embodiment of the invention.

FIG. 6 is a diagram to which a structure of the following embodiment is added to the structure shown in FIG. 2 regarding the portable receiving terminal 2 and the car cradle 3. Accordingly, in the explanation of the following embodiment, only a structure and function that are newly added to the portable receiving terminal 2 and the car cradle 3 in FIG. 2 will be explained.

The newly added structure in the embodiment is structure prepared for a user to hear audio contents received by the portable receiving terminal 2 when the user is on the move such as that the user is heading from home to a car park where his/her car is parked. Specifically, the portable receiving terminal 2 further comprises an audio output socket 48 disposed to the receiving terminal 2 and a headphone 50 provided with a plug 51 which is electrically and mechanically connectable to the audio output socket 48.

The audio output socket 48 and the digital/analog converter 17 in the portable receiving terminal 2 are connected through a signal line provided with a switching element 49 in the middle. Analog audio signal that is output of the analog/digital converter 17 for both right and left channels are transmitted through the signal line to the audio output socket 48. A user is able to hear a sound converted from the analog audio signal when he/she plugs a plug 51 of the headphone 50 into the audio output socket 48 and wears a headphone to his/her own head. There is no need to mention that at this time, the portable receiving terminal 2 is able to output sounds because the electricity is supplied from the power source 9 where the battery 23 being disposed to the respective elements provided inside thereof.

Furthermore, since the portable receiving terminal 2 is also provided with the conditional access portion 14 as in the portable receiving terminal 2 in FIG. 2, the user is able to enjoy audio contents that are he/she subscribed in accordance with the certification process of the conditional access portion 14, as he/she wishes.

Still furthermore, similar to the portable receiving terminal 2 in FIG. 2, the portable receiving terminal 2 according to this embodiment can be mounted to a mounting portion 30 of the car cradle 3. A detection signal that detects whether the portable receiving terminal 2 is mounted on the mounting portion 30 of the car cradle 3 or not is sent out when a projection 35 of the car cradle 3 pushes down a pushdown switch 27. A main controller 20 of the portable receiving terminal 2, triggered by this detection signal, transmits audio signal based on the received signal introduced from the external antennas 4 and introduced to the demodulation portion 13, to an audio signal output terminal 24 through the decoder 16 and a digital/analog converter 17. The transmitted audio signal is further sent through an audio system connection terminal 36 and an audio signal output terminal 39 to the car navigation system 5 shown in FIG. 3 and is eventually input into the car speaker 44. Caused by the input of the signal, the car speaker sounds and thereby the user can enjoy music contents broadcast even in an automobile. Furthermore, in this embodiment, the switching element 49 is disposed in the middle of the signal line and can control the signal line to conduction/non-conduction; accordingly, based on the detected signal, in a state where the portable receiving terminal 2 is mounted on the mounting portion 30, an output of an analog audio signal from the audio output socket 48 may be stopped automatically.

Thus, an effect of the present invention, that is, a user can receive the satellite broadcasted contents irrespective of places where he/she stays by use of the receiving terminal and the cradle can also be realized according to this embodiment.

The present invention is not restricted to the above embodiments.

For instance, in the above embodiments, a car navigation system is explained as an example of the external device, however, the external device may be a car television or other display devices. Similarly, no problem is caused when a display portion is further disposed, for instance, on a backseat of an automobile.

Furthermore, the car cradle is taken as an example for explanation purpose, however, the cradle may also be applied for home use. In such case, as the external device, for instance, a home television can be used. Still furthermore, the portable receiving terminal 2 may be a combined function terminal having functions such as a Personal Digital Assistant (PDA) and a mobile telephone.

As explained above, according to the invention, irrespective of a place, with a receiving terminal, the satellite broadcasted contents can surely be received. Furthermore, by taking advantages of external devices such as a car navigation system, a car television and a car stereo that are mounted on, for instance, an automobile, the information received by the receiving terminal is displayed in very lively manner.

The disclosure of Japanese Patent Application No. 2003-084982 filed Mar. 26, 2003 including Specification, Drawings and Claims are herein incorporated by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A cradle, used for a receiving terminal having a first antenna for receiving a carrier wave convoluted with a signal, a reproducing means for reproducing the signal received through the first antenna and a first output terminal for outputting the reproduced signal, comprising:
   a mounting portion on which the receiving terminal is detachably mounted;
   an external antenna for receiving the carrier wave;
   a transmitting antenna disposed opposite to the first antenna of the receiving terminal, for transmitting the signal received through the external antenna to the receiving terminal mounted on the mounting portion;
   a first input terminal capable of being connected to the first output terminal of the receiving terminal mounted on the mounting portion; and
   a second output terminal for outputting the received signal inputted from the first input terminal.

2. The cradle as set forth in claim 1,
   wherein the receiving terminal has a reproduced signal providing means for providing the reproduced received signal to an user; and
   wherein the cradle has:
   means for causing the receiving terminal to shift from a first mode to a second mode when the receiving terminal is mounted on the mounting portion, the first mode being for providing the user with the received signal by using the reproduced signal providing means, the second mode being having the reproduced signal be capable of being output from the second output terminal.

3. The cradle as set forth in claim 2,
   wherein the reproduced signal providing means is means for displaying the received signal reproduced by the reproducing means.

4. The cradle as set forth in claim 2,
   wherein the reproduced signal providing means is means for outputting the received signal reproduced by the reproducing means as an audible sound.

5. The cradle as set forth in claim 1,
   wherein the second output terminal is capable of being connected to an external device having at least an indicator and means for outputting a control signal for controlling the receiving terminal,
   wherein the cradle has:
   a second input terminal for inputting the control signal transmitted from the external device; and
   a transmitting means for transmitting the control signal inputted through the second input terminal to the receiving terminal mounted on the mounting portion.

6. The cradle as set forth in claim 1, further comprising:
a receiving portion for receiving the control signal which is transmitted from a remote controller to control the receiving terminal; and
a control signal transmitting means for transmitting the received control signal to the receiving terminal mounted on the mounting portion.

7. The cradle as set forth in claim 1, further comprising:
a power source inputting portion for being connected to an external direct current power source; and
a power source supplying portion for supplying the direct current power to the receiving terminal mounted on the mounting portion.

8. A receiving system including a cradle and a receiving terminal,
wherein the cradle has:
a mounting portion on which the receiving terminal is detachably mounted;
an external antenna for receiving a carrier wave convoluted with a signal;
a transmitting means for transmitting the signal received through the external antenna to the receiving terminal mounted on the mounting portion;
a first input terminal capable of receiving a signal from the receiving terminal mounted on the mounting portion;
a first output terminal for outputting the received signal inputted from the first input terminal to an external device;
a control signal receiving means for receiving the control signal which is transmitted from a remote controller to control the receiving terminal; and
a control signal transmitting means for transmitting the received control signal to the receiving terminal mounted on the mounting portion,
wherein the receiving terminal has:
a built-in antenna for receiving the carrier wave convoluted with a signal;
a receiving means for receiving the signal transmitted from the transmitting means of the cradle through the external antenna; first shifting means for shifting the receiving terminal from a first mode to a second mode when the receiving terminal is mounted on the mounting portion, the first mode being for receiving the carrier wave by the built-in antenna, the second mode being for receiving the signal by the receiving means through the external antenna;
a decoding means for decoding the signal received through the built-in antenna or the receiving portion;
a reproducing means for reproducing the received signal decoded by the decoding means;
a second output terminal for outputting the received signal decoded by the decoding means to the first input terminal of the cradle; and
a control signal inputting means for inputting the control signal transmitted from the control signal transmitting means of the cradle.

9. The receiving system as set forth in claim 8,
wherein the receiving terminal has:
a reproduced signal providing means for providing the reproduced signal to an user; and
second shifting means for shifting the receiving terminal from a third mode to a fourth mode when the receiving terminal is mounted on the mounting portion, the third mode for providing the user with the reproduced signal by using the reproduced signal providing means, the fourth mode for having the reproduced signal be capable of being output from the second output terminal to the first input terminal of the cradle.

10. The receiving system as set forth in claim 9,
the reproduced signal providing means is means for displaying the received signal reproduced by the reproducing means.

11. The receiving terminal as set forth in claim 9,
the reproduced signal providing means is means for outputting the received signal reproduced by the reproducing means as an audible sound.

12. The receiving system as set forth in claim 8,
wherein the control signal includes a brake signal of a vehicle capable of being equipped with the receiving terminal, and
wherein the receiving terminal has a restricting means for restricting reproduction by the reproducing means or the output of the reproduced signal from the second output terminal according to the brake signal included in the control signal inputted by the control signal inputting means.

13. The receiving system as set forth in claim 8,
wherein the first output terminal is capable of being connected to the external device having at least an indicator and means for outputting a control signal for controlling the receiving terminal,
wherein the cradle has:
a second input terminal fir inputting the control signal transmitted from the external device; and
a control signal transmitting means for transmitting the control signal inputted through the second input terminal to the control signal inputting means of the receiving terminal mounted on the mounting portion.

14. The receiving system as set forth in claim 8,
wherein the receiving terminal has a battery, and
wherein the cradle has:
a power source inputting portion for being connected to an external direct current power source; and
a power source supplying portion for supplying the direct current power to the battery of the receiving terminal mounted on the mounting portion.

* * * * *

UNITED STATES PATENT AND TRADEMARK OFFICE
CERTIFICATE OF CORRECTION

PATENT NO.        : 7,356,354 B2                                     Page 1 of 1
APPLICATION NO.   : 10/808508
DATED             : April 8, 2008
INVENTOR(S)       : Atsushi Itsukaichi It is certified that error appears in the above-identified patent and that said Letters Patent is hereby corrected as shown below:

Column 12, Line 17:
"terminal" should read -- system --.

Column 12, Line 37:
"fir" should read -- for --.

Signed and Sealed this

Twelfth Day of August, 2008

JON W. DUDAS
*Director of the United States Patent and Trademark Office*